Oct. 30, 1962 R. R. WAREHAM 3,060,821
PHOTOGRAPHIC DEVICE

Filed March 27, 1958 3 Sheets-Sheet 1

INVENTOR.
Richard R. Wareham
BY
Brown and Mikulka
ATTORNEYS

Oct. 30, 1962  R. R. WAREHAM  3,060,821
PHOTOGRAPHIC DEVICE
Filed March 27, 1958  3 Sheets-Sheet 2

INVENTOR.
Richard R. Wareham
BY
Howard Mikulka
ATTORNEYS

United States Patent Office

3,060,821
Patented Oct. 30, 1962

3,060,821
PHOTOGRAPHIC DEVICE
Richard R. Wareham, Marblehead, Mass., assignor to Polaroid Corporation, Cambridge, Mass., a corporation of Delaware
Filed Mar. 27, 1958, Ser. No. 724,306
22 Claims. (Cl. 95—10)

This invention relates to photography and particularly to a novel photoresponsive exposure control mechanism for photographic devices.

Prior photoresponsive exposure control mechanisms have generally consisted of mechanisms wherein single exposure control elements have been adjusted by means responsive to the electrical energy generated by a coupled photoelectric means; or wherein the function of a camera operator has been limited to a simple operation such as adjusting the coincidence of a meter-needle with a fiducial mark coupled with one exposure control element of the camera. Any of these devices provides a camera which may be operated automatically over a range of scene luminosities, subject however, to the limitations imposed by the scope of whatever particular exposure control element is made photoresponsive.

However, where the photoresponsive exposure control element consists of a camera diaphragm, and the shutter mechanism used therewith is of the conventional type, adequate response to the widest range of scene luminosity for which the camera and film have been designed requires that the shutter speed be adjusted manually. Manual adjustment of diaphragm aperture by the operator is similarly required under circumstances where the photoexposure control element consists of the shutter speed control. As physical manipulation by the camera operator of exposure control defeats, at least in part, the purpose of automation of the camera, these exposure control mechanisms cannot be considered to be fully automatic. Additionally, many of the prior photoresponsive exposure control mechanisms require complex and delicate electronic circuitry of limited life under service conditions, or require utilization of auxiliary power sources such as batteries which need periodic replacement.

Accordingly, one object of this invention is to provide, in a photographic device, a fully automatic photoresponsive exposure control mechanism whereby both the effective exposure aperture and effective shutter speed are functions of scene luminosity. Further objects are to provide, in a photographic device, an automatic photoresponsive exposure control mechanism wherein the exposure time is controlled over a wide range of scene luminosity; to provide such an exposure control mechanism, characterized by simplicity of both mechanical and electrical components, and comprising a substantially free-moving shutter element having an uncovering edge disposed for movement in an apparent direction at a predetermined angle to the direction of movement of said element, and a diaphragm means for proportionately occluding portions of an exposure aperture responsively to electrical signals generated by the photoelectric means; to provide an exposure control mechanism comprising, in combination, a photosensitive means for producing electrical signals in accordance with intensities of scene luminosity, electromagnetic means for translating said signals into corresponding positional relationships of a movable occluding element with an exposure aperture for varying both the effective area of said exposure aperture and the effective exposure time. Another object is to provide an automatic shutter mechanism comprising, in combination, photosensitive means for producing electrical signals in accordance with light incident thereon, housing means having an exposure aperture therein, a substantially free-moving shutter element for covering and uncovering said aperture, said element having a predetermined excursion in a plane and having an edge disposed for uncovering said aperture by an uncovering movemen tin an apparent direction in said plane of said excursion at an angle to the direction of said excursion, and means for controlling the effective exposure area of said aperture proportionately to said electrical signals, the last-named means cooperating with said shutter element for producing wide variations in the effective exposure through said aperture. Another object is to provide an automatic shutter mechanism for cooperation with a lens system of a camera, said mechanism comprising, in combination, photosensitive means for producing electrical signals in accordance with light incident thereon, means defining an exposure aperture, said aperture being noncircular and having at least two end portions joined by sides, one of said end portions being larger than the other of said end portions, said aperture being so disposed that the optic axis of said lens system lies perpendicularly to a point approximately equidistant between said sides, said point lying further from said larger end portion than from said other end portion, means for controlling exposure time through said aperture, and means for controlling the effective exposure area of said aperture, the last-named means being coupled with said photosensitive means and cooperating with said means for controlling the exposure time to vary exposures through said aperture responsively to said electrical signals.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
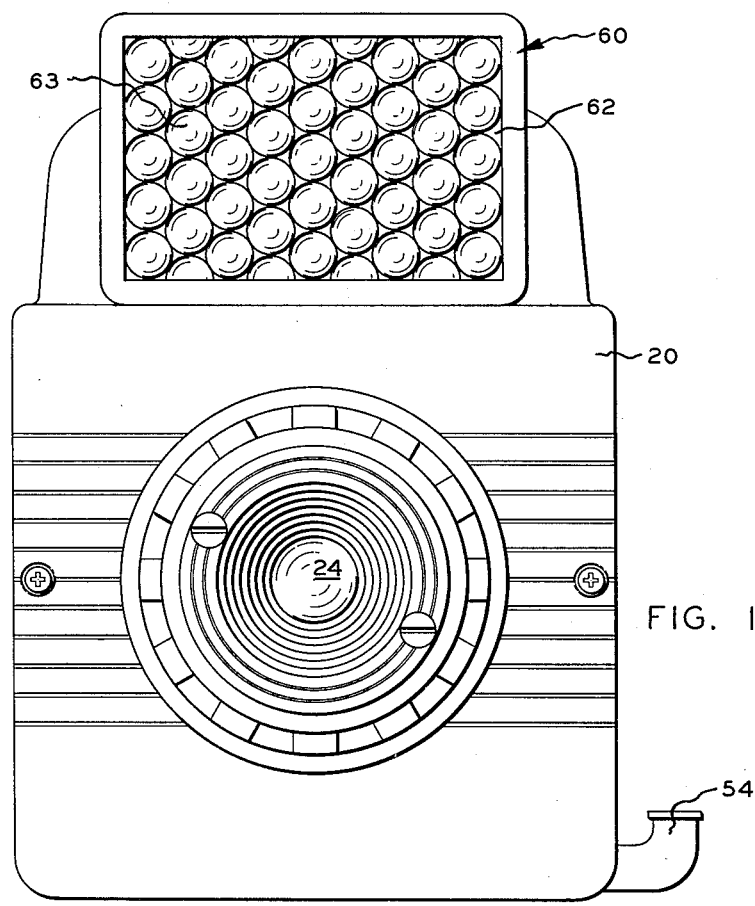
FIGURE 1 is a plan view of the front housing and associated elements.

Generally, this invention relates to photoresponsive mechanisms which may include a shutter assembly of the general type described in U.S. Patent No. 2,531,936, issued on November 28, 1950 to Murry N. Fairbank and Sidney B. Whittier. This shutter is of the type characterized by having a substantially free-moving shutter element. The shutter element is supported in an operative relation to an exposure aperture, the element completely covering the aperture when in a normal or stationary position. The element is mounted so that an aperture-uncovering movement may be imparted thereto, the mounting preferably comprising a relatively friction-free bearing, and the element being preferably free to rotate through a predetermined arc. For imparting this aperture-uncovering motion to the shutter element there is provided a means such as an impulse member energized as by a spring. The impulse member may be held in a set, i.e., energized position, for example, by a latch means. A tripping means is arranged to release the latch means, thereby releasing the impulse member from set position and permitting the impulse member to strike a portion of the shutter element, thus rotating said element at a substantially constant speed around its pivotal axis from its stationary position to a displaced position wherein said exposure aperture is uncovered. The extent of arcuate travel or excursion of the shutter blade is controlled by providing a reversing means for intercepting and reversing the direction of rotation of the shutter element at a predetermined point, the reversing means being disposed in the arcuate path of travel of a portion of said element. Thus, the time during which the exposure aperture is uncovered depends upon the speed and excursion of the shutter element. The speed of rotation of the shutter element depends upon its moment of inertia and the magnitude of the impact given to it by the impulse member. Consequently, for example, where the position of the reversing means is fixed and the excursion predetermined thereby and where the moment of inertia has been predetermined, each of a series of rotations of said shutter element will have the same total time interval for the excursion thereof.

The present invention comprehends the use of a novel modification of this type of shutter in combination with a photosensitive means whereby both the effective exposure time and effective exposure area of said aperture are varied in accordance with the magnitude of electrical energy generated by said photosensitive means. Ordinarily, in shutters of the type disclosed in the aforementioned patent, exposure time is a function of the blade excursion from a closed or rest position to a rebound position and back to the rest position, the diameter or width of the aperture being relatively minor in proportion to the total blade excursion. The shutter blade is generally characterized by having a substantially straight uncovering edge disposed approximately normally to the path of the blade excursion. Variations in exposure time may, in this type of shutter, be accomplished by altering accordingly the force imparted by the impulse member to the blade, thus changing the rotational speed of the blade, or, by changing the position of the reversing means located at the rebound position, thus changing the total excursion. However, where it is desired, as in the preferred embodiment of this invention, to so limit the blade excursion that the uncovering edge travels only from a rest position approximately tangent one edge of the aperture to a rebound position approximately tangent an opposite edge of the aperture, it is readily apparent that the above methods for altering exposure time are unsatisfactory. Obviously, under such circumstances, the position of the reversing means is fixed to meet the requirements, and the striking force of the impulse member is not readily susceptible to accurate control, particularly where very slow blade speeds might be required.

Consequently, as a means for varying exposure time, this invention is provided with a novel modification of a substantially free-moving blade having an uncovering edge which is so disposed at a small angle, preferably an angle between 5° and 20°, to the path of the blade excursion that the apparent uncovering motion of said edge across the exposure aperture is in an apparent direction at a large angle, preferably between 70 and 85°, to the said path. The invention is also provided with a diaphragm means for occluding the exposure aperture, said diaphragm means having a covering edge movable approximately in the apparent direction of the uncovering motion of said blade edge. This combination of blade and diaphragm means provides both a means for varying the exposure time by varying the effective width of the aperture (both blade speed and excursion being unaltered) and a means for varying the effective area of the exposure aperture to limit the total light flux transmissible therethrough.

Figure 2:
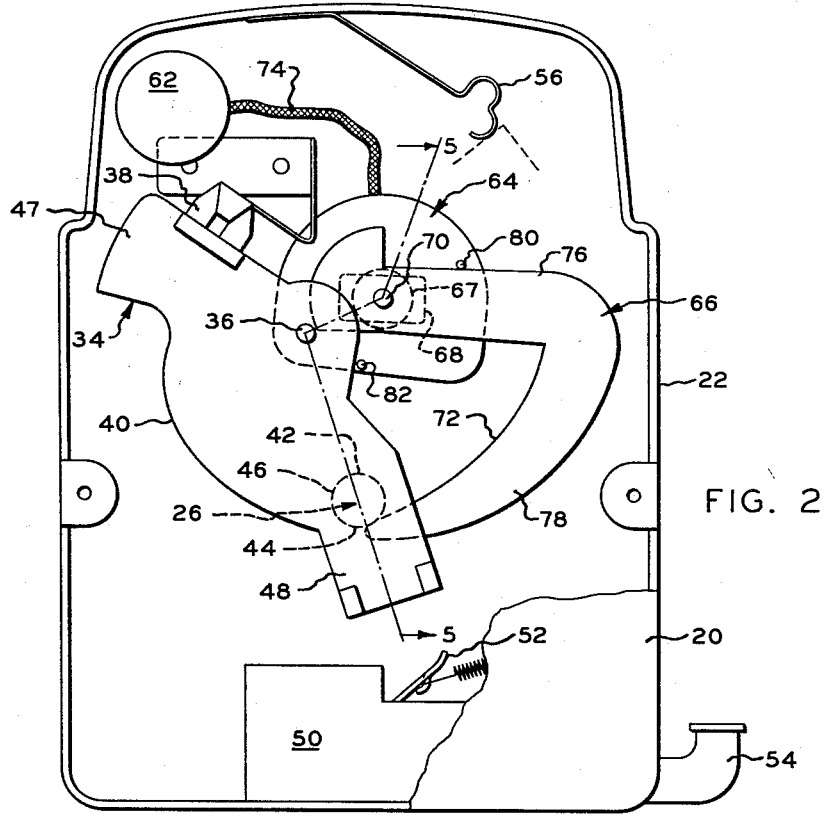
FIG. 2 is a plan view of a preferred form of the shutter and diaphragm assembly of the present invention in a rest position, the front housing and its associated lens elements and photoelectric cell in FIGURE 1 being removed.
Figure 5:
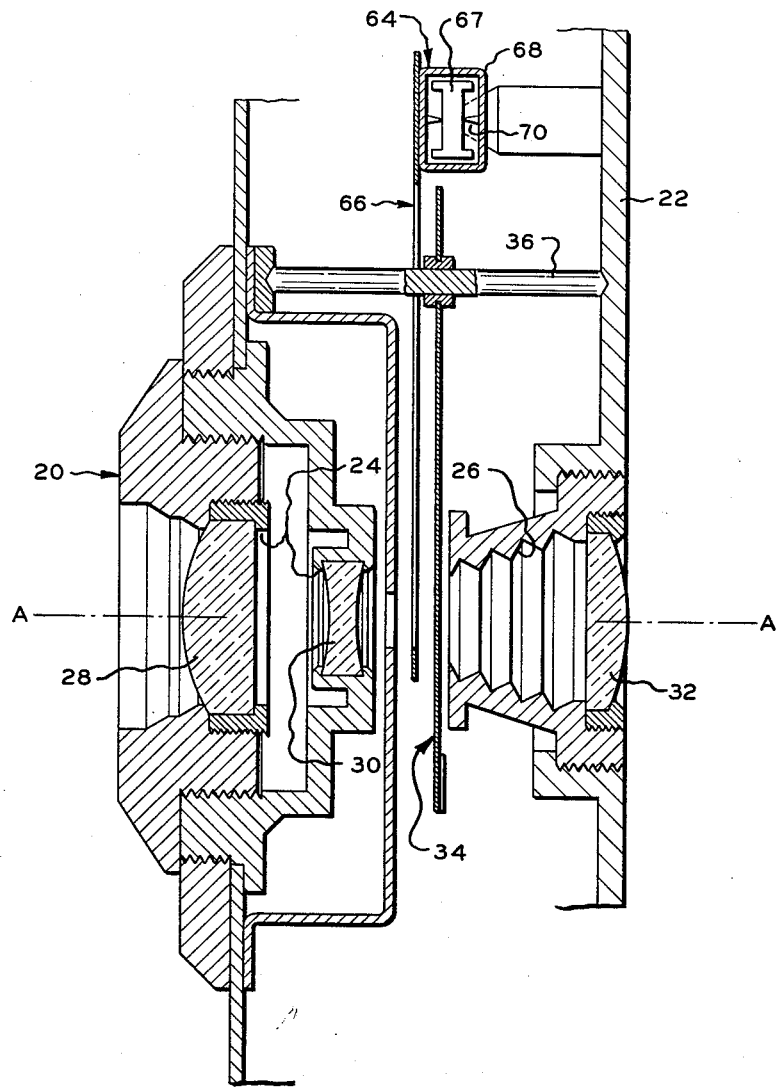
FIG. 5 is a section of FIG. 2 taken along the line 5—5 and showing, in addition, fragments of the front housing and lens system in operative position.

Referring now to the various drawings, wherein like numerals refer to like parts, the preferred form of the present invention will be apparent. Referring particularly to FIGURES 1, 2 and 5, there is shown a housing means which, for instance, may comprise front housing portion 20 and rear housing portion 22. As a means for defining an exposure aperture, front housing 20 includes aperture 24 therein and rear housing portion 22 includes aperture 26 therein, aperture 24 and aperture 26 being disposed coaxially with respect to one another, said apertures being shown as having a circular cross-section. Suitably mounted in these two housing portions is a lens system having an optical axis indicated at A—A, said axis being disposed coaxially with respect to aperture 24 and aperture 26. The lens system may comprise, for example, a front lens 28, a middle lens 30 and a rear lens 32. Positioned, for example, between the rear lens and said middle lens is a movable shutter element, which in the form shown comprises a substantially free-moving blade 34, said blade being rotatably mounted on a suitable bearing generally indicated at 36, said bearing being preferably adapted to minimize friction. Blade 34 is shown in FIGURE 2 in a stationary position wherein said blade completely covers aperture 26, said blade being releasably retained in said position by means such as magnet 38.

Blade 34 comprises a planar member having a curved opening edge 40 which is shaped non-circularly with respect to the axis of rotation of said element, the curve having a least radius which is less than the distance from said axis to that edge 42 of aperture 26 closest to said axis, and having a greatest radius greater than that distance from said axis to that edge 44 of aperture 26 furthest from said axis. Said curve also has a length approximately equal to the excursion of blade 34 from a first position wherein said greatest radius lies tangent to a side edge 46 of said aperture to a second position wherein said least radius lies tangent to said side edge of said aperture, the first position being the stationary position and the second position being the displaced or uncovering position. The word "radius" is limited herein to mean a distance from said axis to a point on said curve. Blade 34 also comprises a retaining portion 47 and an impact portion 48, each of said portions, in the form shown, being an arm extending approximately radially from said axis at opposite extremities of curved blade edge 40. This configuration provides a blade which, when rotated in a plane perpendicular to the optic axis A—A of the lens system, presents an opening movement of said blade edge in an apparent direction approximately normal to the arc of rotation of said blade at aperture 26, thereby lengthening the actual excursion of the blade while maintaining an apparent movement across aperture 26 only between edge 44 of the aperture to an opposite edge 42 of the aperture. In the preferred embodiment an approximate exposure time of 1/25th of a second is readily obtainable with the use of this blade although other exposure times may be preferred for other circumstances. It should be noted that the configuration of said blade edge may be any one of a plurality of various curves, including straight lines, disposed at a small angle to the arcuate path of the blade excursion, and that, blade speed and excursion and aperture width being unchanged, variations in shutter speeds and shutter speed ranges may be thus obtained.

As a means for imparting a rotational aperture-uncovering movement to blade 34, there is provided a mechanism of the general type described in the aforementioned patent wherein is disclosed a means, as hereinbefore described, for imparting an aperture-uncovering movement to a shutter blade of the "free-moving" type. As so described, such a means for imparting an aperture-uncovering movement is preferably utilized with the shutter blade disclosed in this application, such mechanism being designated generally at 50. Shown extending from said means for imparting an aperture-uncovering movement are an impulse member 52 so disposed with respect to blade 34 as to impart a rotational movement to said blade when said impulse member is rotated, and a means for actuating said means for imparting an aperture-uncovering movement, designated generally at 54.

The extent of rotation of blade 34, when actuated by said means for imparting an aperture-uncovering movement, is limited by contact of impact portion 48 of blade 34 with a means, such as rebound spring 56, for reversing the direction of rotation of said blade. The rebound spring is mounted on rear housing portion 22 in the path of arcuate movement of the blade at a predetermined position such that the movement of blade 34 is reversed when said blade has arrived at the displaced or uncovering position. Rebound spring 56 may be formed of any suitable resilient material such as steel, phosphor-bronze or the like. It may be curved in form, as shown, or any other suitable shape or thickness for storing the energy of the blade on impact and imparting said energy to the blade to reverse the direction of rotation thereof. Thus, it is apparent that the speed of rotation of the blade through a single exposure cycle, comprising successive clockwise and counterclockwise rotation, is predetermined by such factors as the force imparted to the blade by the impulse member, the resilient characteristics of the rebound spring and the frictional characteristics of the blade bearing. It is, of course, preferred that these factors be substantially invariant as it is desired to maintain a substantially constant time interval for successive exposure cycles.

As a means for generating electrical signals in accordance with light incident thereon, there is provided a photosensitive means which, as included in this invention and designated generally at 60, may comprise any of the photovoltaic cells which generate electrical energy directly or the photoconductive cells which modify electrical energy from an external source. In the preferred embodiment, the photosensitive means is shown in FIGURE 1 as a photovoltaic cell 62 mounted on front housing portion 20, said cell being provided across the photosensitive surface thereof with means such as a lenticular transparent cover 63 for limiting the field of view. Other means for either limiting the field of view or for controlling the intensity of light incident upon said photosensitive surface may be employed, said means being well known to the art. Photovoltaic cell 62 may be so disposed that the field of view subtended by the photosensitive surface thereof substantially embraces the field of view of the lens system, said photosensitive surface being preferably located substantially perpendicular to the optical axis of said lens system. Photovoltaic cell 62 may also be releasably mounted on said housing portion for removal and exposure to light other than that light which comprises the field of view of the lens system.

An electromagnetic means for translating the signals generated by photovoltaic cell 62 into corresponding positional relationships of a movable occluding element relative to exposure aperture 26 for varying both the effective area of said aperture and the effective exposure time proportionately to said signals comprises an electromagnetic element such as galvanometer 64 cooperating with a diaphragm means, such as diaphragm blade 66. Galvanometer 64 may comprise any of the usual galvanometers well known in the art, preferably of the D'Arsonval type, which generally includes the usual permanent magnet 67 and a rotatable field coil 68. Field coil 68 is rotatably mounted on bearing means 70 which are disposed on rear housing portion 22 adjacent the pivotal axis of shutter blade 34. It should be noted that although bearing means 70 of coil 68 may be disposed coaxially with respect to the pivotal axis of the shutter blade, it is, however, preferable that the bearing means be disposed adjacent said pivotal axis. The latter disposition allows the apparent direction of opening motion of both the uncovering edge 40 of shutter blade 34 and the covering edge 72 of diaphragm blade 66 to be as nearly in the same direction as possible throughout the respective rotational arcs of both blades. There are provided means such as leads 74, for electrically coupling photovoltaic cell 62 with galvanometer 64, through which leads may be transmitted the electrical energy generated by cell 62, said energy being fed thereby into field coil 68.

Attached to coil 68 and rotatable therewith is a means such as diaphragm blade 66 for occluding aperture 26, diaphragm blade 66 being rotatable in a plane which is substantially parallel with the plane of rotation of shutter blade 34 and, in the preferred embodiment, in a direction generally oposite to the direction of rotation of shutter blade 34. Diaphragm blade 66, in the form shown, comprises a scythe-shaped element having a handle portion 76 attached to coil 68 and a curved portion 78 disposed in the plane of and at an angle to handle portion 76. Said curved portion has an aperture-covering edge 72, said edge being disposed adjacent edge 44 of aperture 26 when coil 68 is in a rest position, said rest position of coil 68 representing a minimal light intensity incident on photocell 62. Aperture-covering edge 72 of diaphragm blade 66 has a configuration which is non-circular with respect to the axis of rotation of said blade, which configuration provides a covering movement across aperture 26 during rotation of coil 68 from said rest position to a fully displaced position representing a maximum light intensity upon photocell 62, said covering movement being in a direction approximately normal to the arcuate path of curved portion 78. It should be noted that at a fully displaced position of coil 68, covering edge 72 has covered such a portion of the area of aperture 26 that only a predetermined minimum of light is transmissible therethrough. Disposed at predetermined positions on galvanometer 64 are stop means, such as pin 80 and pin 82 for determining the limits of the arcuate travel of diaphragm blade 66.

Figure 4:
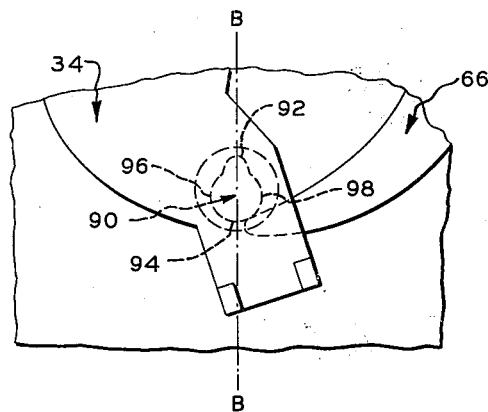
FIG. 4 is a schematic plan view of another embodiment of the aperture showing the associated shutter blade and diaphragm blade in fragment.
Figure 3:
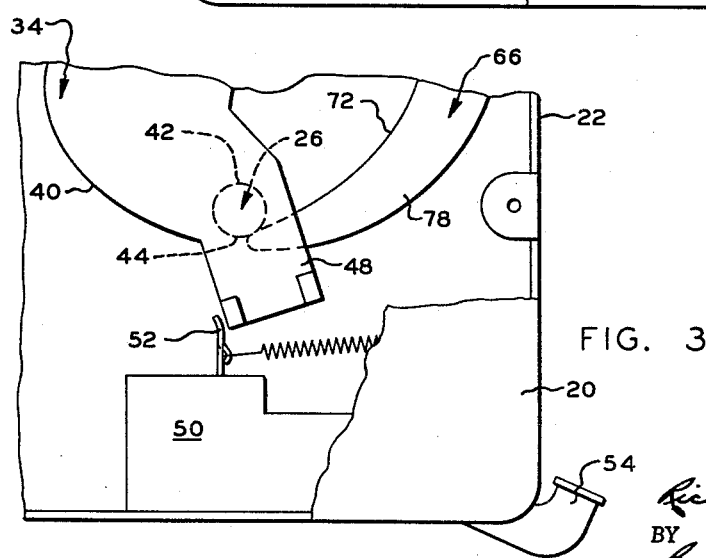
FIG. 3 is a plan view of the embodiment of FIG. 2 showing the actuating means in a set position.

The mechanism heretofore disclosed in FIGS. 1 through 3 shows exposure aperture 26 as having a circular cross-sectional configuration, the aperture being disposed coaxially with respect to the axis of the lens system. Although satisfactory photographs may be obtained with an aperture having said configuration, it is apparent that the effective exposure area through aperture 26 bears a nonlinear relationship with respect to the angular displacement of coil 68 from its rest position. Also, as diaphragm blade 66 is moved to a position wherein a portion of aperture 26 is covered, as for instance one-half of the area of the cross-section of aperture 26, the effective exposure area through aperture 26 is off-center with respect to the optic axis of the lens assembly. Additionally, where diaphragm blade 66 has covered the greater portion of aperture 26, the effective exposure area remaining has a configuration similar to a cross-section of a thin lens. This latter configuration is undesirable because it would tend to distort a photographic image and cause undesirable interference phenomena. Consequently, in the modification of the invention, as shown in FIG. 4, there is provided an aperture 90 having a non-circular cross-sectional configuration that is disposed nonconcentrically and bilaterally symmetrically with respect to the optic axis of the lens assembly. As shown, aperture 90 comprises an opening having a "pear-shaped" configuration defining at least two end portions, one of said end portions being larger than the other of said end portions, as for instance, narrow end portion 92 and wide end portion 94. Portion 92 and portion 94 are joined by sides 96 and 98. Aperture 90 has a long axis B—B of bilateral symmetry lying equidistant between said sides, said aperture being so disposed that the optic axis A—A of the lens assembly perpendicularly intersects the plane of aperture 90 at long axis B—B adjacent narrow extremity 92. This configuration thereby preferably provides an aperture so shaped that the area covered by diaphragm blade 66 bears an approximately linear relationship to the angular displacement of coil 68 from the rest position. Furthermore, where the effective exposure aperture provided by the combination of diaphragm blade and aperture 90 is substantially less than one-half of the area of aperture 90, the approximate geometrical center of that effective exposure area is then substantially coaxially disposed with respect to the optic axis of the lens assembly. Additionally, at very small exposure aperture areas, the combination of diaphragm blade and aperture 90 will result in an effective exposure aperture having aproximately equal axes perpendicular to one another, hence reasonably undistorted light transmitting qualities.

In operation, pressure, applied by an operator to means 54 for actuating the means for imparting an aperture-uncovering movement, releases impulse member 52 for imparting an impact to bounce portion 48 of shutter blade 34 and thus rotates blade 34 from the stationary position to a displaced position. At said displaced position, bounce portion 48 of blade 34 contacts rebound spring 56 and the direction of rotation of blade 34 is reversed, blade 34 being then impelled in a clockwise direction to return to the stationary position. During the rotation of blade 34 from said stationary to said displaced position, opening edge 40 has an opening movement across aperture 26, the opening movement being in an apparent direction approximately normal to the arc of rotation of said blade at said aperture.

Photocell 62, disposed on front housing portion 20 substantially normal to the optic axis of the lens assembly, generates electrical signals proportional to the intensity of the light incident on the photosensitive surface of the cell. These signals are transmitted through leads 74 to the coil 68 of galvanometer 64, the coil rotating in accordance with said signals to a position of equilibrium determined by the strength of the signals opposing the internal spring bias of the galvanometer. Coil 68, by so rotating, rotates diaphragm blade 66 in a plane parallel to the plane of rotation of shutter blade 34, covering edge 72 of diaphragm blade 66 having a covering movement in an apparent direction across aperture 26 to a position wherein diaphragm blade 66 occludes a portion of the aperture, the magnitude of said portion being determined by the equilibrium position of coil 68. Not only does the equilibrium position of coil 68 thus determine the effective exposure aperture presented by the combination of aperture 26 and diaphragm blade 66, but because diaphragm blade 66 has occluded a portion of aperture 26, which portion lies between edge 44 and the center of the aperture, the width of aperture 26 in the direction of movement of shutter blade 34 has been decreased. By decreasing thereby the distance across the aperture which shutter blade 34 must travel to effect an exposure, the effective exposure time has been varied without changing either the total excursion or the speed of rotation of the shutter blade.

It is to be understood that the shape of the exposure apertures shown are arbitrary and that other apertures having suitable configurations and dispositions with respect to the optic axis A—A of the lens assembly may be added according to the exposure characteristics desired. It will be further understood that the positions at which the diaphragm and shutter blade may be pivoted may be interchanged and that the rotation of the diaphragm blade and shutter blade may be in the same direction as well as in opposite directions as described. Mechanisms schematically shown in the drawings indicate a plurality of elements which are in the preferable form for performing various functions as hereinbefore described. However, it will be evident that certain of these elements may be readily altered in form or interchanged with further modifications and that numerous other elements could be employed within the scope of the invention to perform similar functions. For example, rebound springs of various forms may be employed or, if preferred, the rebound spring could be incorporated with the shutter blade per se. Or, for example, the mechanism may be provided with a diaphragm blade having a covering edge and being so movable that the covering movement of said edge is in the same direction as the movement of the blade. It should be noted that the movement of either or both of the shutter blade and diaphragm blade may be translatory as well as rotational.

It is apparent that rotational movement of the entire mechanism might well alter the equilibrium position of the diaphragm blade, it being impossible to provide a diaphragm blade having no inertia. Consequently, detent means may be provided for releasably retaining the diaphragm blade in a given position of equilibrium at the time that it is desired to make an exposure. This detent means may, of course, be either independent of or synchronized with the actuating means. The shutter mechanism herein disclosed may also be utilized as the shutter mechanism in a camera or may equally well be used as a means for adapting a standard camera for automatic shutter control as an external attachment to said camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photoresponsive exposure control mechanism comprising, in combination, photosensitive means for producing electrical signals in accordance with the intensity of light incident thereon, housing means having an exposure aperture therein, movable covering means mounted for movement across said aperture along a predetermined path to a predetermined position for variably determining an effective exposure area of said aperture, said predetermined path being in a first plane disposed normally to the optic axis through said exposure aperture, said covering means including a covering edge so disposed that during movement of said covering means said edge appears to move in a first direction at an angle to said first path relative to said aperture, means electrically coupled with said photosensitive means and for moving said covering means responsively to said electrical signals to said predetermined position, a substantially free-moving shutter element for covering and uncovering said effective exposure area, said element having a predetermined excursion in a second plane disposed substantially parallel with said first plane, said element including an uncovering edge and being so disposed and constructed that during movement of said shutter element said uncovering edge uncovers said aperture by movement in an apparent direction approximately normal to the path of said predetermined excursion and substantially parallel to said predetermined direction, and means for imparting said uncovering movement to said shutter element.

2. A photoresponsive exposure control mechanism as defined in claim 1 wherein said shutter element comprises a planar shutter blade pivotally mounted upon said housing means in covering relation to said aperture, said uncovering edge being curved and non-circular with respect to the pivotal axis of said blade.

3. A photoresponsive exposure control mechanism as defined in claim 1 wherein said shutter element comprises a shutter blade pivotally mounted upon said housing means, said uncovering edge being curved and non-circular with respect to the pivotal axis of said blade, said curved uncovering edge having at least radius which is less than the distance from said pivotal axis to that edge of said exposure aperture closest to said axis and a greatest radius which is larger than the distance from said pivotal axis to that edge of said exposure aperture which is furthest from said axis.

4. A photoresponsive exposure control mechanism coming, in combination, photosensitive means for producing electrical signals in accordance with the intensity of light incident thereon, means for defining an exposure aperture, movable covering means cooperating with said aperture for variably determining an effective exposure area of said aperture by movement of an edge of said covering means across said aperture in a predetermined direction in a first plane disposed normally to the optic axis of said aperture, said edge of said covering means being disposed approximately normally to said predetermined direction, means electrically coupled with said photosensitive means and for moving said covering means responsively to said electrical signals, a substantially free-moving shutter blade pivotally mounted adjacent said aperture for covering and uncovering said effective exposure area, said blade having a curved opening edge which is non-circular with respect to the pivotal axis of said blade, said curved opening edge having a least radius which is less than the distance from said pivotal axis to that edge of said exposure aperture closest to said axis and a greatest radius which is larger than the distance from said pivotal axis to that edge of said exposure aperture which is furthest from said axis, said blade having a predetermined excursion in a second plane disposed parallel to said first plane, said curved opening edge having a curvilinear length which is at least equal to the excursion of said blade from a first position wherein said greatest radius so lies approximately tangent to a side of said aperture that said blade covers said aperture and a second position wherein said least radius lies tangent to said side of said aperture, and means for imparting an aperture uncovering movement to said blade.

5. A photoresponsive exposure control mechanism as defined in claim 4 wherein a tangent to the curve of said curved opening edge at said aperture is disposed at an angle to the path of said excursion of said blade, said angle being between 5° and 20°.

6. A photoresponsive exposure control mechanism as defined in claim 4 wherein said shutter blade is movable through a rotation cycle interval for covering and uncovering said aperture, said interval being substantially invariant.

7. A photoresponsive exposure control mechanism comprising, in combination, photosensitive means for producing electrical signals in accordance with the intensity of light incident thereon, housing means having an exposure aperture therein, movable covering means cooperating with said aperture for variably determining an effective exposure area of said aperture, said covering means having an edge, means electrically coupled with said photosensitive means and for moving said edge of said covering means across said aperture in a predetermined direction responsively to said electrical signals, said edge of said covering means being disposed approximately normally to said predetermined direction, a shutter element for covering and uncovering said effective exposure area, said element having an edge constructed for uncovering said effective exposure area by an uncovering movement in an apparent direction across said aperture during movement of said element in approximately said predetermined direction, said edge of said element being disposed approximately normally to said predetermined direction, impact means for imparting a rotational aperture-uncovering movement to said shutter element, and resilient rebound means for limiting the rotational excursion of said shutter blade and for reversing the direction of said rotation, said rebound means being disposed in the arcuate path of movement of said shutter blade.

8. A photoresponsive exposure control mechanism comprising, in combination, photosensitive means for producing electrical signals in accordance with the intensity of light incident thereon, housing means for defining an exposure aperture, a diaphragm blade pivotally mounted on said housing means and being rotatable along an arcuate path between a first position and a second position relative to said aperture, said diaphragm blade having an edge which is so constructed that said aperture is coverable and uncoverable by motion of said edge of said diaphragm blade in a predetermined apparent direction approximately normally to said edge of said diaphragm blade during movement of said diaphragm blade, said edge of said diaphragm blade being disposed at an angle to said arcuate path, means electrically coupled with said photosensitive means and for moving said diaphragm blade responsively to said electrical signals, a shutter element for covering and uncovering said aperture, said element having an edge which is constructed for uncovering said element by an uncovering movement across said aperture in approximately said predetermined direction, and means for moving said shutter element.

9. A photoresponsive exposure control mechanism as defined in claim 7 wherein said shutter element comprises a rotatably mounted planar shutter blade, said edge of said element being curvilinear.

10. A photoresponsive exposure control mechanism as defined in claim 7 wherein said shutter element comprises a planar shutter blade pivotally mounted upon said housing means, said edge of said element being curved noncircularly with respect to the pivotal axis of said blade.

11. A photoresponsive exposure control mechanism as defined in claim 8 wherein said shutter element comprises a shutter blade pivotally mounted upon said housing means, said edge of said element being non-circular with respect to the pivotal axis of said shutter blade, said shutter blade being movable between a covering position and an uncovering position, the direction of movement of said shutter blade from said covering position to said uncovering position being opposed to the direction of movement of said diaphragm blade from said first position to said second position.

12. A photoresponsive exposure control mechanism as defined in claim 8 wherein said edge of said diaphragm blade is non-circular with respect to the pivotal axis of said diaphragm blade.

13. An automatic exposure control mechanism comprising, in combination, photovoltaic means for generating electrical signals in accordance with the intensity of light incident thereon, housing means having an exposure aperture therein, a planar diaphragm member for covering and uncovering portions of said aperture by movement of an edge of said member across said aperture in a predetermined direction, said edge of said member being disposed approximately normally to said predetermined direction, a galvanometer element for moving said diaphragm member, means for electrically coupling said photovoltaic means with said galvanometer element, a substantially free-moving shutter blade mounted on said housing means for movement along a predetermined path between covering and uncovering positions relative to said aperture, said shutter blade having an edge which is so constructed that said aperture is coverable and uncoverable by motion of said edge of said blade in approximately said predetermined direction across said aperture at an angle to said predetermined path during movement of said shutter blade, said edge of said blade being disposed approximately normally to said predetermined direction, means for imparting an aperture-uncovering movement to said shutter blade, resilient means for reversing the direction of said aperture-uncovering movement of said blade, and means for retaining said blade in said aperture-covering position.

14. A photoresponsive exposure control mechanism comprising, in combination, photosensitive means for producing electrical signals in accordance with radiation incident thereon, means for defining an exposure aperture, covering means mounted for movement across said aperture along a first path to a predetermined position for variably determining an effective exposure area of said aperture, means electrically coupled with said photosensitive means and for so moving said covering means responsively to said electrical signals to said predetermined position that said effective exposure area is proportional to said radiation, and a shutter element mounted for movement across said aperture along a second predetermined path for covering and uncovering said effective exposure area to effect exposure therethrough, said shutter element including an uncovering edge so disposed that during said movement of said shutter element said uncovering edge uncovers said effective exposure area by a movement in an apparent direction relative to said aperture approximately normal to said second path and in the direction of said first path.

15. A photoresponsive exposure control mechanism comprising, in combination, photosensitive means for producing electrical signals in accordance with radiation incident thereon, means for defining an exposure aperture, movable covering means including an edge thereof movable therewith relative to said aperture in a predetermined direction to a position at which said edge cooperates with said aperture for variably determining an effective exposure area of said aperture, means electrically coupled with said photosensitive means and for so moving said covering means responsively to said electrical signals that said effective exposure area is determined in proportion to said radiation, and a shutter element mounted for movement across said aperture along a predetermined path for covering and uncovering said effective exposure area, said element including an edge so constructed and disposed that during said movement of said element said edge uncovers said effective exposure area by an uncovering movement in an apparent direction relative to said aperture approximately normal to said predetermined path.

16. An exposure control mechanism comprising, in combination, means for defining an exposure aperture, covering means mounted for movement across said aperture along a first path to a predetermined position for variably determining an effective exposure area of said aperture, means for moving said covering means to said predetermined position, and a shutter element mounted for movement across said aperture along a second path for covering and uncovering said effective exposure area to effect exposure therethrough, said shutter element including an uncovering edge so disposed that during said movement of said shutter element said uncovering edge uncovers said effective exposure area by a movement in an apparent direction relative to said aperture approximately normal to said second path and in the direction of said first path.

17. An exposure control mechanism comprising, in combination, housing means having an exposure aperture therein, movable covering means mounted for movement across said aperture along a predetermined path to a predetermined position for variably determining an effective exposure area of said aperture, said predetermined path being in a first plane disposed normally to the optic axis through said exposure aperture, said covering means including a covering edge so disposed that during movement of said covering means said edge appears to move in a first direction at an angle to said first path relative to said aperture, means for moving said covering means to said predetermined position, a substantially free-moving shutter element for covering and uncovering said effective exposure area, said element having a predetermined excursion in a second plane disposed substantially parallel with said first plane, said element including an uncovering edge and being so disposed and constructed that during movement of said shutter element said uncovering edge uncovers said aperture by movement in an apparent direction approximately normal to the path of said predetermined excursion and substantially parallel to said first direction, and means for imparting said uncovering movement to said shutter element.

18. An exposure control mechanism comprising, in combination, housing means having an exposure aperture therein, movable diaphragm means cooperating with said aperture for variably determining the dimensions of an effective exposure area of said aperture, a rotatable shutter blade for covering and uncovering said effective exposure area, said blade being mounted for a predetermined excursion in a plane substantially perpendicular to the optic axis of said aperture, said blade having a curved opening edge which is non-circular with respect to the pivotal axis of said blade, said curved opening edge having a least radius which is less than the distance from said pivotal axis to that edge of said exposure aperture closest to said pivotal axis and a greatest radius which is larger than the distance from said pivotal axis to the edge of said exposure aperture which is furthest from said pivotal axis, and means for imparting rotational movement to said blade to uncover said exposure area.

19. An exposure control mechanism comprising, in combination, means for defining an exposure aperture, movable covering means cooperating with said aperture for variably determining an effective exposure area of said aperture by movement of an edge of said covering means across said aperture in a predetermined direction in a first plane disposed normally to the optic axis of said aperture, said edge of said covering means being disposed approximately normally to said predetermined direction, a shutter blade pivotally mounted adjacent said aperture for covering and uncovering said effective exposure area, said blade having a curved opening edge which is non-circular with respect to the pivotal axis of said blade, said curved opening edge having a least radius which is less than the distance from said pivotal axis to that edge of said exposure aperture closest to said axis and a greatest radius which is larger than the distance from said pivotal axis to that edge of said exposure aperture which is furthest from said axis, said blade having a predetermined excursion in a second plane disposed substantially parallel to said first plane, said curved opening edge having a curvilinear length which is at least equal in length to the excursion of said blade from a first position wherein said greatest radius so lies approximately tangent to a side of said aperture that said blade covers said aperture and a second position wherein said least radius lies tangent to said side of said aperture, and means for rotating said blade whereby said edge uncovers said aperture.

20. An exposure control mechanism comprising, in combination, means for defining an exposure aperture, a diaphragm element mounted for cooperation with said aperture for variably determining the dimensions of an effective exposure area of said aperture movement, and a shutter blade mounted for covering and uncovering movement across said effective exposure area, said blade having an edge which forms an acute angle to the path of said movement of said blade whereby during movement of said shutter blade said edge appears to move across said aperture in a direction substantially perpendicular to the path of said movement.

21. An exposure control mechanism as defined in claim 20 wherein said shutter blade is movable between a first position wherein said blade fully covers said aperture and a second position wherein said blade uncovers said exposure aperture, said edge of said element being approximately tangent to the periphery of said exposure aperture when said element is in said first position.

22. An exposure control mechanism comprising, in combination, means for defining an exposure aperture, a diaphragm element mounted for cooperation with said aperture for variably determining the dimension of an effective exposure area of said aperture in a predetermined direction across said aperture, and a shutter blade mounted for covering and uncovering movement across said effective exposure area along a predetermined path which at said exposure aperture is substantially perpendicular to said direction, said blade having an edge which is approximately perpendicular to said direction and is non-parallel to said path, whereby during movement of said blade said edge appears to move across said exposure area in a second direction substantially parallel to said first direction.

References Cited in the file of this patent

UNITED STATES PATENTS

| | | |
|---|---|---|
| 2,076,481 | Riszdorfer | Apr. 6, 1937 |
| 2,124,886 | Mihalyi | July 26, 1938 |
| 2,209,639 | Tonnies | July 30, 1940 |
| 2,557,389 | Moomaw et al. | June 19, 1951 |
| 2,638,825 | Fairbank | May 19, 1953 |

UNITED STATES PATENT OFFICE
CERTIFICATE OF CORRECTION

Patent No. 3,060,821

October 30, 1962

Richard R. Wareham

It is hereby certified that error appears in the above numbered patent requiring correction and that the said Letters Patent should read as corrected below.

Column 8, line 70, for "having at least" read -- having a least --; column 9, lines 1 and 2, for "mechanism coming" read -- mechanism comprising --.

Signed and sealed this 17th day of September 1963.

(SEAL)
Attest:

ERNEST W. SWIDER
Attesting Officer

DAVID L. LADD
Commissioner of Patents